(12) United States Patent
Chen et al.

(10) Patent No.: US 11,778,484 B2
(45) Date of Patent: *Oct. 3, 2023

(54) MOBILITY AND ZONE MANAGEMENT IN ZONE-BASED FEDERATED LEARNING

(71) Applicant: QUALCOMM TECHNOLOGIES, INC., San Diego, CA (US)

(72) Inventors: An Chen, San Diego, CA (US); Vijaya Datta Mayyuri, San Diego, CA (US)

(73) Assignee: QUALCOMM Technologies, Inc., San Diego, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/517,633

(22) Filed: Nov. 2, 2021

(65) Prior Publication Data

US 2023/0140704 A1 May 4, 2023

(51) Int. Cl.
*H04W 16/22* (2009.01)
*G06N 3/08* (2023.01)
(Continued)

(52) U.S. Cl.
CPC .............. *H04W 16/22* (2013.01); *G06N 3/08* (2013.01); *H04W 4/021* (2013.01); *H04W 4/025* (2013.01)

(58) Field of Classification Search
CPC ..... H04W 4/021; H04W 4/025; H04W 16/22; H04W 8/183; H04W 8/186; H04W 8/20; H04W 8/245; G06N 3/08; G06N 3/085; G06N 3/09; G06N 3/091; G06N 3/092; G06N 3/095
See application file for complete search history.

(56) References Cited

U.S. PATENT DOCUMENTS

| | | | |
|---|---|---|---|
| 2012/0023043 A1* | 1/2012 | Cetin .................. | G06Q 30/0254 706/12 |
| 2015/0237471 A1* | 8/2015 | Li .......................... | H04W 64/00 455/456.2 |

(Continued)

OTHER PUBLICATIONS

S. Luo et al.: "HFEL: Joint Edge Association and Resource Allocation for Cost-Efficient Hierarchical Federated Edge Learning", IEEE Transactions on Wireless Communications, vol. 19, No. 10, Jun. 26, 2020 (Jun. 26, 2020), pp. 6535-6548 (Year: 2020).*

(Continued)

*Primary Examiner* — Jean A Gelin
(74) *Attorney, Agent, or Firm* — Seyfarth Shaw LLP

(57) ABSTRACT

A method for mobility and zone management in zone-based federated learning includes receiving, at a zone management device of multiple zone management devices, a global model from a first network device associated with the global model. Each of the multiple zone management devices is associated with a corresponding zone model of multiple zone models. The zone management device transmits the global model to mobile devices in a first zone associated with the first zone model based on a zone membership. The zone management device receives weights associated with the global model from each mobile device in the first zone. The zone management device updates the first zone model based on the received weights and the zone membership. The zone management device transmits the updated first zone model to each mobile device in the first zone.

28 Claims, 10 Drawing Sheets

(51) Int. Cl.
 *H04W 4/021* (2018.01)
 *H04W 4/02* (2018.01)

(56) References Cited

U.S. PATENT DOCUMENTS

| | | | |
|---|---|---|---|
| 2018/0039406 A1* | 2/2018 | Kong | G06F 3/03547 |
| 2020/0329335 A1* | 10/2020 | Parshin | H04B 7/0619 |
| 2021/0158099 A1* | 5/2021 | Tuor | G06N 3/049 |
| 2021/0329522 A1* | 10/2021 | Li | H04W 36/18 |
| 2022/0044095 A1* | 2/2022 | Poojary | G06N 3/08 |
| 2022/0351860 A1* | 11/2022 | Aghaei | G16H 30/40 |
| 2022/0417108 A1* | 12/2022 | Mayyuri | G06N 3/084 |
| 2023/0065937 A1* | 3/2023 | Satheesh Kumar | G06Q 10/047 |

OTHER PUBLICATIONS

Hu B., et al., "Federated Region-Learning: An Edge Computing Based Framework for Urban Environment Sensing", 2018 IEEE Global Communications Conference (GLOBECOM), Dec. 9, 2018, 7 Pages.
International Search Report and Written Opinion—PCT/US2022/045946—ISA/EPO—Jan. 25, 2023.
Wikipedia, "Federated learning", Jul. 16, 2021, 11 Pages, XP055883312, Retrieved from the Internet: URL: https://en.wikipedia.org/w/index.php?title=Federated_learning&oldid=1033895866#cite_note-:3-4, 3 Page.

* cited by examiner

MOBILITY AND ZONE MANAGEMENT IN ZONE-BASED FEDERATED LEARNING

FIELD OF THE DISCLOSURE

Aspects of the present disclosure generally relate to neural networks and more particularly to techniques and apparatuses for mobility and zone management in zone-based federated learning.

BACKGROUND

Federated learning is an approach for collaborative training of neural networks across multiple users without gathering data at a central location. Because of the decentralized data, federated learning is beneficial for applications in which privacy is a significant factor. Conventional federated learning solutions for mobile sensing data (e.g., data collected from smart phones) have problems in terms of model accuracy, due to their lack of adaptability to user mobility behavior. In large geographic areas (e.g., cities), user behavior and implicitly their mobile sensing data typically varies by zone (e.g., city districts). For example, users in a business district may have different behavior compared with users in a shopping district. A global model across all zones may suffer due to the non-Independent and Identically Distributed (non-IID) data distribution across zones. Using conventional methods to improve model accuracy for non-IID data may lead to privacy trade-offs (e.g., data augmentation) and may still not adapt well to localized mobile user behavior.

SUMMARY

The present disclosure is set forth in the independent claims, respectively. Some aspects of the disclosure are described in the dependent claims.

In an aspect of the present disclosure, a method for managing model updates is provided. The method includes receiving, at a zone management device of multiple zone management devices, a global model from a first network device associated with the global model. Each of the multiple zone management devices is associated with a corresponding zone model of a multiple zone models. The method also includes transmitting, from the zone management device, the global model to mobile devices in a first zone associated with a first zone model based on a zone membership. Additionally, the method includes receiving, at the zone management device, weights associated with the global model from each mobile device in the first zone. The method also includes updating, at the zone management device, the first zone model based on the received weights and the zone membership. Further, the method includes transmitting, from the zone management device, the updated first zone model to each mobile device in the first zone.

In an aspect of the present disclosure, an apparatus for managing model updates is provided. The apparatus includes a memory and one or more processors coupled to the memory. The processor(s) are configured to receive, at a zone management device of multiple zone management devices, a global model from a first network device associated with the global model. Each of the multiple zone management devices is associated with a corresponding zone model of a multiple zone models. The processor(s) are also configured to transmit, from the zone management device, the global model to mobile devices in a first zone associated with a first zone model based on a zone membership. In addition, the processor(s) are configured to receive, at the zone management device, weights associated with the global model from each mobile device in the first zone. The processor(s) are also configured to update, at the zone management device, the first zone model based on the received weights and the zone membership. Further, the processor(s) are configured to transmit, from the zone management device, the updated first zone model to each mobile device in the first zone.

In an aspect of the present disclosure, an apparatus for managing model updates is provided. The apparatus includes means for receiving, at a zone management device of multiple zone management devices, a global model from a first network device associated with the global model. Each of the multiple zone management devices is associated with a corresponding zone model of a multiple zone models. The apparatus also includes means for transmitting, from the zone management device, the global model to mobile devices in a first zone associated with a first zone model based on a zone membership. Additionally, the apparatus includes means for receiving, at the zone management device, weights associated with the global model from each mobile device in the first zone. The apparatus also includes means for updating, at the zone management device, the first zone model based on the received weights and the zone membership. Further, the apparatus includes means for transmitting, from the zone management device, the updated first zone model to each mobile device in the first zone.

In an aspect of the present disclosure, a non-transitory computer readable medium is provided. The computer readable medium has encoded thereon program code for managing model updates. The program code is executed by a processor and includes code to receive, at a zone management device of multiple zone management devices, a global model from a first network device associated with the global model. Each of the multiple zone management devices is associated with a corresponding zone model of a multiple zone models. The program code also includes code to transmit, from the zone management device, the global model to mobile devices in a first zone associated with a first zone model based on a zone membership. Additionally, the program code includes code to receive, at the zone management device, weights associated with the global model from each mobile device in the first zone. The program code also includes code to update, at the zone management device, the first zone model based on the received weights and the zone membership. Furthermore, the program code includes code to transmit, from the zone management device, the updated first zone model to each mobile device in the first zone.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
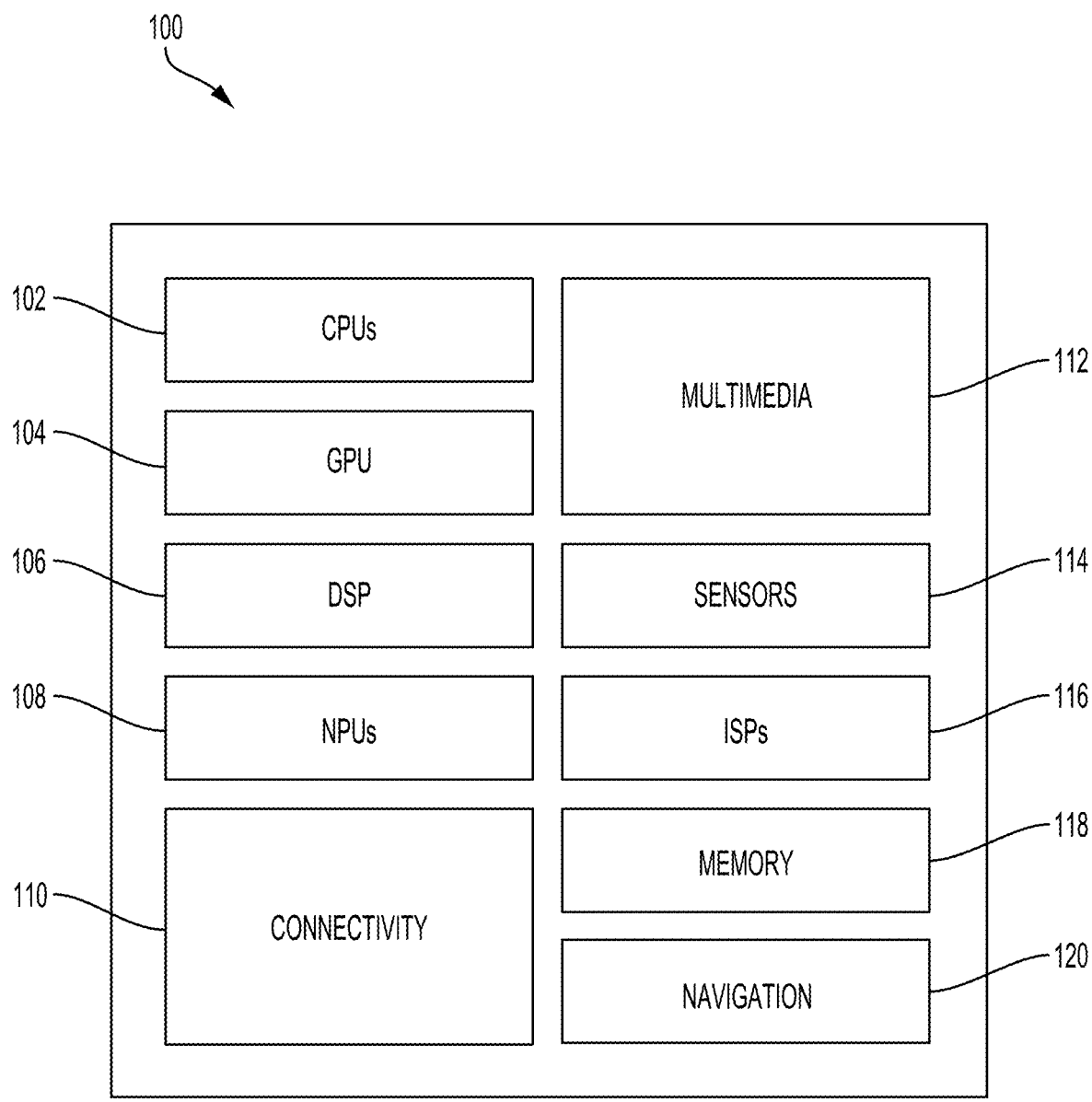
FIG. 1 illustrates an example implementation of designing a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described, federated learning is an approach for collaborative training of neural networks across multiple users without gathering data at a central location. Because of the decentralized data, federated learning is beneficial for applications in which privacy is a significant factor. Conventional federated learning solutions for mobile sensing data (e.g., data collected from smart phones) have problems in terms of model accuracy, due to their lack of adaptability to user mobility behavior. In large geographic areas (e.g., cities), user behavior and implicitly their mobile sensing data typically varies by zone (e.g., city districts). For example, users in a business district may have different behavior compared with users in a shopping district. A global model across all zones may suffer due to the non-Independent and Identically Distributed (non-IID) data distribution across zones. Using conventional methods to improve model accuracy for non-IID data may lead to privacy trade-offs (e.g., data augmentation) and may still not adapt well to localized mobile user behavior.

Zone-based federated learning may divide a space (e.g., a geographic area) into a number of zones with similar user behaviors. A federated learning model may be trained for each of the defined zones. Zone-based federated learning may be implemented in a mobile-edge-cloud infrastructure, in which edge nodes manage the federated training for zone-based federated learning models within each of the zones. Edge nodes may host the updated models for their zones, and a mobile device may download the zone-model upon entry of a zone. As such, the mobile device may participate in the federated learning and may be referred to as a participating device.

A cloud device (e.g., a server) may dynamically manage the zones in the entire space (e.g., geographic area) and may provide a coordinator function to support load-balancing and fault-tolerance across the edge nodes. Zone-based federated learning models may provide improved scalability relative to other conventional federated learning approaches. That is, rather than managing a model based on data distributed over a large number of devices, zone-based federated learning models may manage edge nodes which manage each of the defined zones, which are substantially smaller in number than the number of devices throughout the zone-based federated learning model. Additionally, zone-based federated learning may beneficially offer lower latency for mobile users, reduced battery power consumption on mobile devices, and may results in less network bandwidth consumption in the network core.

Zone-based federate learning models may also be broadly applicable. For instance, zone-based federated learning may improve the model performance for a wide range of location-based services and applications. In one example, zone-based federated learning may be applied to parking locator services. In this example, the model may provide a recommendation of a street or street segment where a driver may find available parking spaces at a given time. The recommendation may be based on data collected from participating devices such as mobile devices, IoT devices or electric vehicles in a zone. Parking conditions may vary substantially across zones and over time.

In another example, the zone-based federated learning model may provide a place (e.g., sightseeing spots, shops, restaurants or the like) or event recommendation within a zone. For instance, in a shopping district, users may receive a recommendation for shops, while in a tourist zone, the model may recommend sightseeing spots. On the other hand the zone-based federated learning model may suggest local events (social, concerts, sports, hobbies, etc.) and predict whether a user is likely interested in attending the events. The event recommendation may be made based on learning spatio-temporal relations among events and user interests over time.

Further examples of applications of zone-based federated learning model may be applied to advertising, health and wellness recommendations as well as smartphone optimizations. However, as federated averaging and model aggregation is performed at the zone level, it is challenging to manage device mobility between zones and to modify or update zone boundaries in a dynamic manner.

Accordingly, to address these and other challenges, aspects of the present disclosure are directed to improving the management of device mobility in zone-based federated learning.

FIG. 1 illustrates an example implementation of a system-on-a-chip (SOC) 100, which may include a central processing unit (CPU) 102 or a multi-core CPU configured to manage zone configurations and model updates in zone based federated learning in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to receive, at a zone management device of multiple zone management devices, a global model from a first network device associated with the global model. Each of the multiple zone management devices associated with a corresponding zone model of multiple zone models. The instructions loaded into the CPU 102 may also comprise code to transmit, from the zone management device, the global model to mobile devices in a first zone associated with the first zone model based on a zone membership. The instructions loaded into the CPU 102 may additionally comprise code to receive, at the zone management device, weights associated with the global model from each mobile device in the first zone. The instructions loaded into the CPU 102 may also comprise code to update, at the zone management device, the first zone model based on the received weights and the zone membership. The instructions loaded into the CPU 102 may further comprise code to transmit, from the zone management device, the updated first zone model to each mobile device in the first zone.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
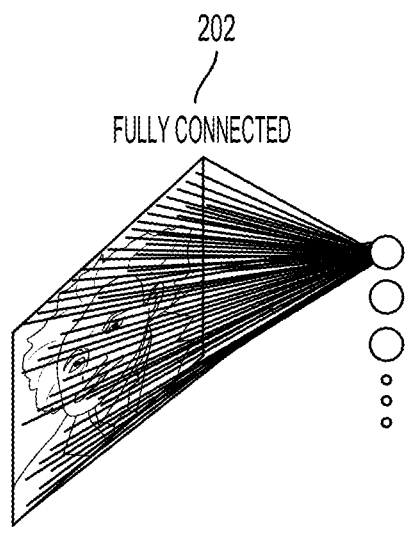
FIGS. 2A, 2B, and 2C are diagrams illustrating a neural network, in accordance with aspects of the present disclosure.
Figure 2B:
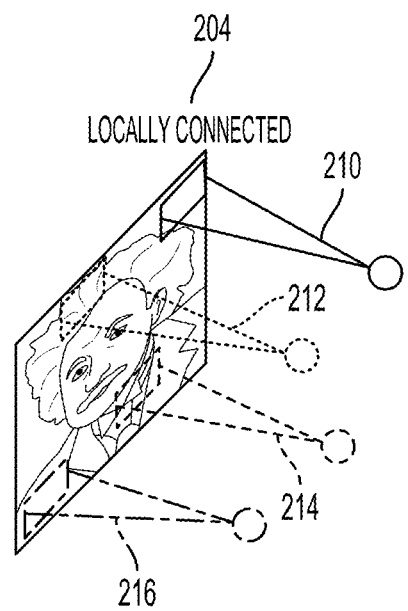

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
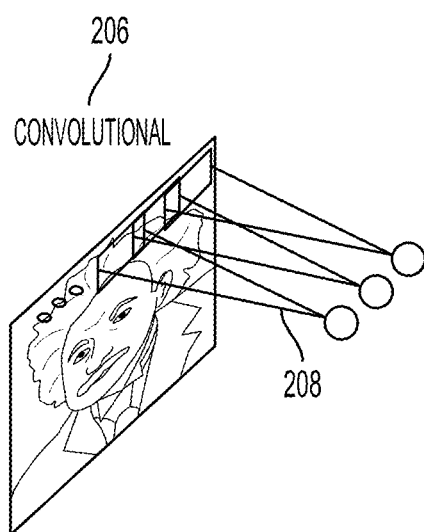

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
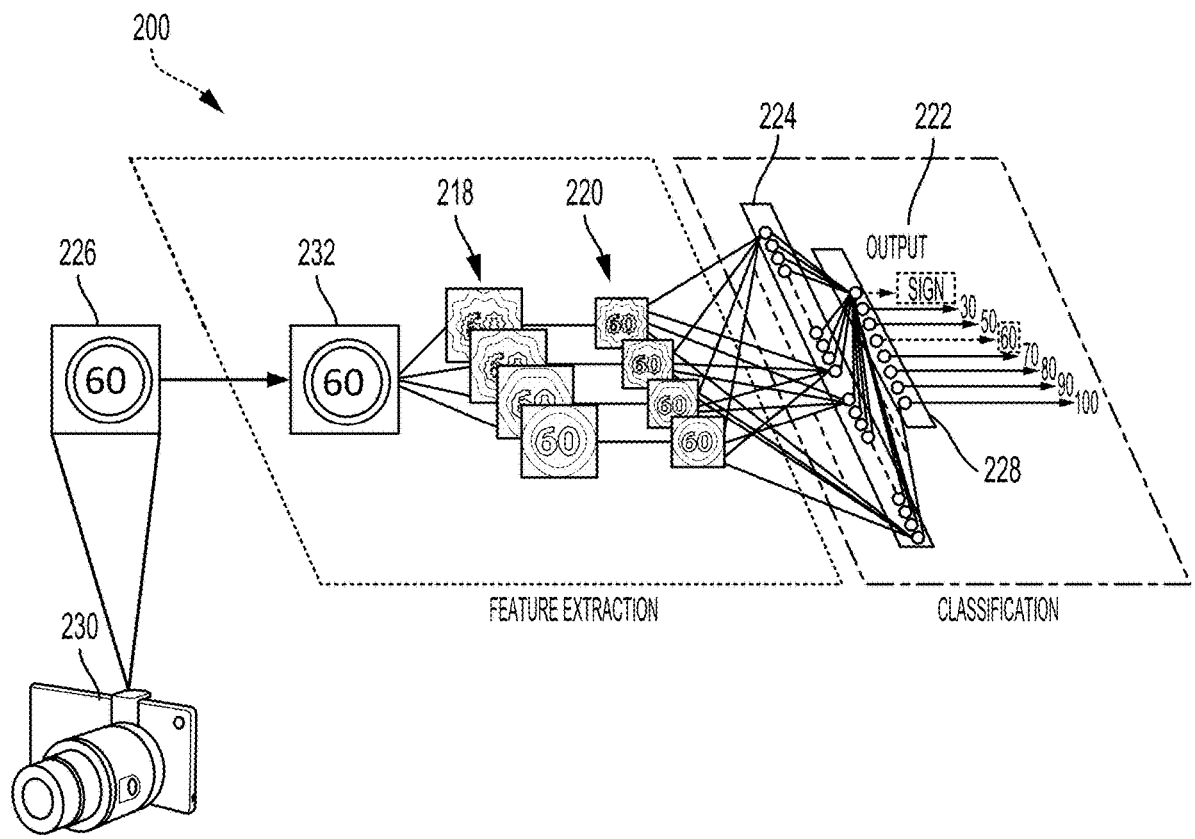
FIG. 2D is a diagram illustrating an exemplary deep convolutional network (DCN), in accordance with aspects of the present disclosure.

One type of convolutional neural network is a deep convolutional neural network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
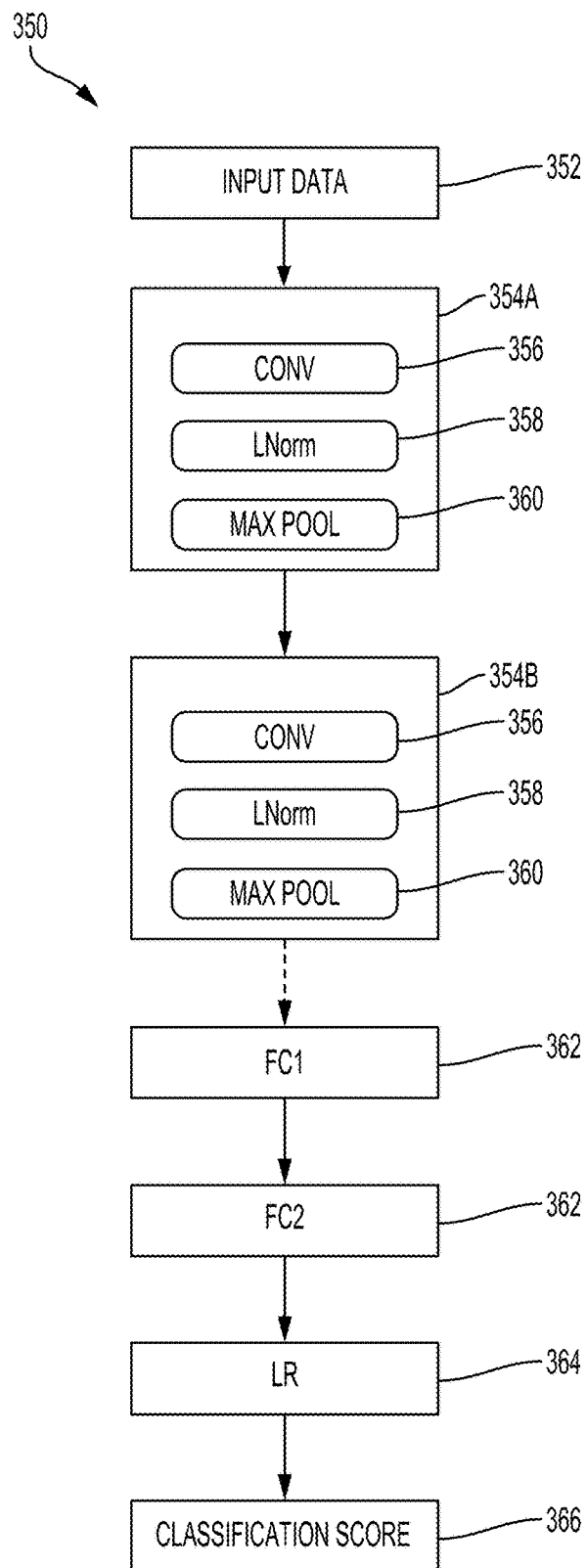
FIG. 3 is a block diagram illustrating an exemplary deep convolutional network (DCN), in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
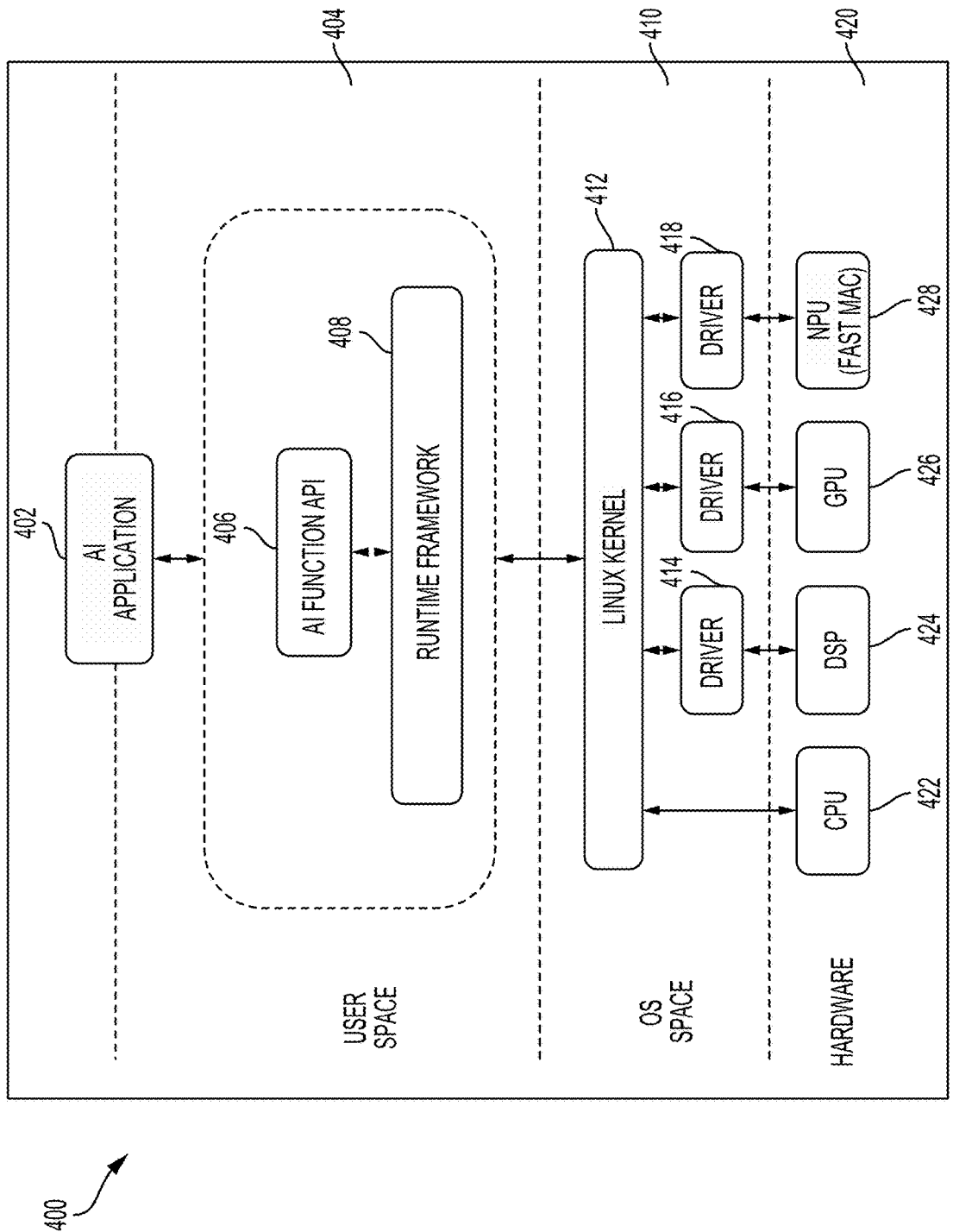
FIG. 4 is a block diagram illustrating an exemplary software architecture that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture, applications may be designed that may cause various processing blocks of an SOC 420 (for example a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a Linux Kernel 412, running on the SOC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428, if present.

According to certain aspects of the present disclosure, each of the fully connected layers 362 may be configured to determine parameters of the model based upon desired one or more functional features of the model, and develop the one or more functional features towards the desired functional features as the determined parameters are further adapted, tuned and updated.

As indicated above, FIGS. 1-4 are provided as examples. Other examples may differ from what is described with respect to FIGS. 1-4.

As described, zone-based federated learning may divide a space (e.g., a geographic area) into a number of zones with similar user behaviors. A federated learning model may be trained for each of the defined zones. Zone-based federated learning may be implemented in a mobile-edge-cloud infrastructure, in which edge nodes manage the federated training for zone-based federated learning models within each of the zones. Edge nodes may host the updated models for their zones, and a mobile device may download the zone-model upon entry of a zone. A cloud device (e.g., a server) may dynamically manage the zones in the entire space (e.g., geographic area) and may provide a coordinator function to support load-balancing and fault-tolerance across the edge nodes. Zone-based federated learning models may provide improved scalability relative to other conventional federated learning approaches. That is, rather than managing a model based on data distributed over a large number of devices, zone-based federated learning models may manage edge nodes which manage each of the defined zones, which are substantially smaller in number than the number of devices throughout the zone-based federated learning model. Additionally, zone-based federated learning may beneficially offer lower latency for mobile users, reduced battery power consumption on mobile devices, and may results in less network bandwidth consumption in the network core.

However, as federated averaging and model aggregation is performed at the zone level, it is challenging to manage device mobility between zones and to modify or update zone boundaries in a dynamic manner. Accordingly, aspects of the present disclosure are directed to improving the management of device mobility in zone-based federated learning.

Figure 5:
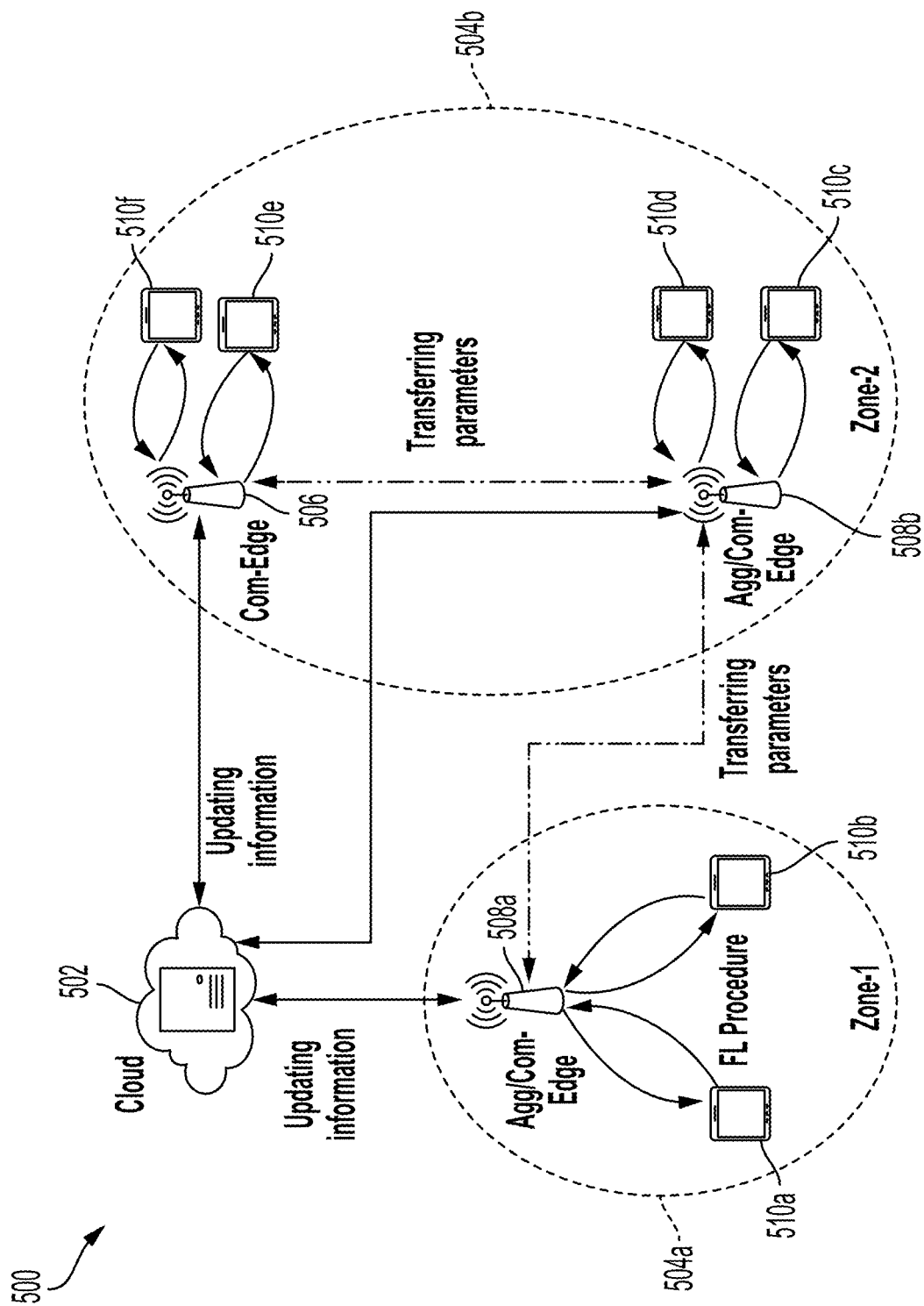
FIG. 5 is a diagram illustrating an example zone network topology, in accordance with aspects of the present disclosure.

FIG. 5 is a diagram illustrating an example zone network topology 500, in accordance with aspects of the present disclosure. Referring to FIG. 5, the example zone network topology 500 includes two zones, zone-1 504a, and zone-two 504b. For brevity and ease of illustration two zones are shown, however, the zone network topology may include more than two zones. Each of the zones 504a, 504b may include multiple participating devices 510a-510f. Each of the participating devices 510a-510f may be a mobile communication device such as a smartphone or an electric vehicle, or an Internet of Things (IoT) device, for example. Each of the participating devices may be included in a group corresponding to a zone (e.g., 504a or 504b) based on one or more common attributes or settings. In some examples, a participating device (e.g., 510a-510f) may be placed in more than one group (not shown in FIG. 5). Additionally, or alternatively, two or more zones may overlap (not shown in FIG. 5). As described, the attributes and settings may include, but are not limited to, a geographic location, a default language, or a user interface theme. As an example, each zone 504a or 504b may be based on a geographic location of the participating devices 510a-510f.

Each of the participating devices 510a-510f may interface and communicate with one or more communicator edge nodes (e.g., 506, 508a, and 508b). In some aspects, a communicator edge node (e.g., 506, 508a and 508b) may also act as an aggregator for a given zone. An aggregator may be configured to perform zone level federated averaging. That is, the aggregator may receive model updates computed at each of the participating devices (e.g., 510a-510f) for a zone (e.g., 504a or 504b) and may compute an average for that zone. For instance, the communicator edge node 508a may also serve as an aggregator for zone-1 504a. On the other hand, the communicator edge node 508b may also serve as an aggregator for zone-2 (504b). In some aspects, the communicator edge nodes (e.g., 506, 508a, and 508b) and the aggregator nodes may be a base station (e.g., gNode B). For example, in 5G NR and later deployments, mobile edge compute (MEC) devices may serve as an aggregator (508a) or communicator (e.g., 506, 508a, and 508b).

Each zone (e.g., 504a, 504b) may include one or more communicator edge nodes (e.g., 506) and an aggregator (e.g., 508a, 508b). The aggregator (e.g., 508a, 508b) may receive a global model from the cloud device 502. The aggregator may distribute the global model to each of participating devices in the zone. Each of the participating devices may be trained with global model to produce a local model. As each device may collect data and operate the local model, each of the participating device may be re-trained (e.g., according to a loss function) producing a local model update. Each of the aggregators (e.g., 508a, 508b) may receive the local model update from the devices in respective zones. For instance, aggregator 508a may receive a local model update from devices 510a and 510b. The aggregator 508a may aggregate the local model updates and compute a zone-model update, for example, using a federated averaging process. The aggregator (e.g., 508a) may then supply the zone-model update to each of the participating devices (e.g., 510a-510f) in the zone. In addition, the aggregator (e.g., 508a, 508b) may supply the zone-model update to the cloud device 502, which manages the global model.

Figure 6:
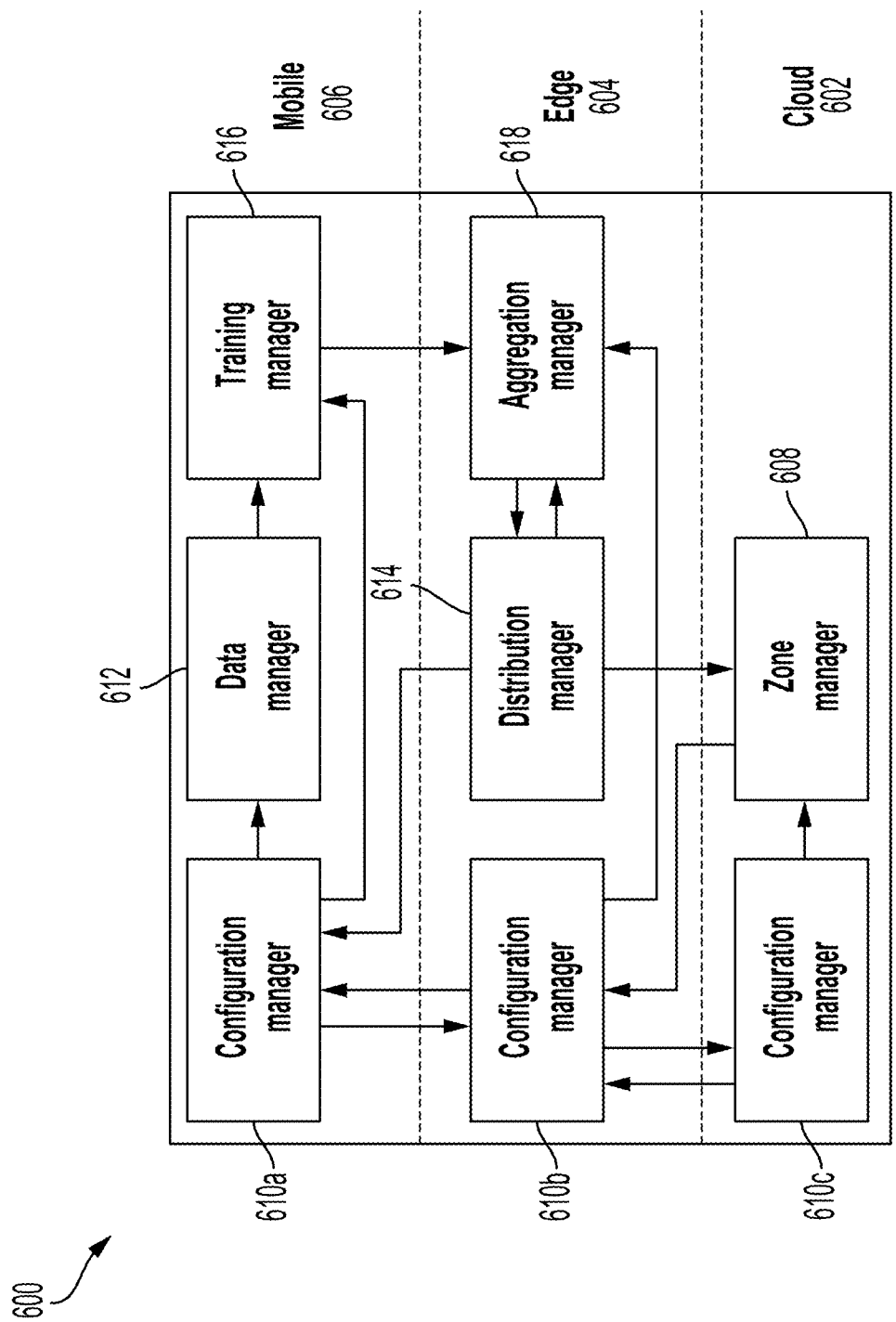
FIG. 6 is a diagram illustrating an example architecture for zone mobility management, in accordance with aspects of the present disclosure.

FIG. 6 is a diagram illustrating example architecture 600 for zone mobility management, in accordance with aspects of the present disclosure. Referring to FIG. 6, the example architecture 600 may be divided into three domains including a cloud domain 602, an edge domain 604, and a mobile domain 606. The cloud domain 602 may serve as a central device (e.g., cloud device 502 shown in FIG. 5) for federated learning. The cloud domain 602 may include a zone manager 608 which is responsible for maintaining the global network topology. The zone manager 608 may handle zone management tasks such as creating new zones, combining zones, or splitting existing zones into multiple zones, for example.

The edge domain 604 may include management devices that are responsible for forming a zone. These management devices may, for example, include an aggregator (e.g., 508a or 508b) and one or more communicator edge devices (e.g., 506, 508a, or 508b). One or more of such management devices may serve as an aggregation manager 612, a distribution manager 608 and a configuration manager 604b.

The mobile domain 606 may include participating devices (e.g., 510a-510f) that perform data collection and local training of the zone-model. Each of the participating devices may include a training manager 616, a data manager 612 and a configuration manager 610a. The data manager 612 may maintain the data separately on each participating device (e.g., 510a-510f) to preserve data privacy. The training manager 616 for each participating device may compute a local model update based on the respective participating device data from the data manager 612. The training manager 616 may transmit the local model updates to an aggregation manager 618 of the edge domain 604.

The aggregation manager 618 of the edge domain 604 may compute a zone-model update. In some aspects, the aggregation manager 618 may compute the zone-model update according to a federated averaging process, for example. The aggregation manager 618 may then supply the zone-model update to the distribution manager 614. In turn, the distribution manager 614 may transmit the zone-model update to the participating devices in the associated zone. In addition, the distribution manager 614 may provide the zone-model update to the zone manager 608 in the cloud domain 602 to update to the global model.

As shown in the FIG. 6, the configuration management may be spread across each of the domains. The configuration managers 610a-610c may maintain and communicate meta-data for device identification, device zone membership (e.g., home-zone identification), model identification, and training state information (e.g., training round, model-specific parameters). Additionally, the configuration managers 610a-610c may also maintain and communicate meta-data for home and visitor zone discovery (e.g., when a participating device travels to a different zone in a geographic based application) and zone management, for example.

Participating devices (e.g., 510a-510f) may be included in one or more zones (e.g., 504a or 504b). Each participating device may have a home zone assignment. A home zone may be a primary zone in which the participating device is a member. For instance, a home zone may be a zone in which the participating device has the most shared attributes. In one example, the home zone may be based on the geographic location of the participating device. However, zone membership is not fixed and may be modified. The modification of zone membership may be referred to as zone mobility. The zone membership may be managed via the configuration managers 610a-610c.

In some aspects, the home zone membership may be selected by a user or may be set via participating device settings, user preferences or a combination thereof, for example. For instance, the home zone membership may be selected via the configuration manager 610a based on a user's specified language preference (e.g., English). In another example, home zone membership may be selected via the configuration manager 610a when a participating device (e.g., 510a-510f) initially participates in federated training. For instance, a home zone may be determined based on the location of participating device purchase or initial connection of the participating device to a service provider network. Additionally, the configuration manager 510b for a zone may set or modify the home zone for a participating device, for example, based on time spent in the zone. The time spent in a zone may correspond to time connected to or in communication with an edge communicator (e.g., 506) for the zone (e.g., 504b).

A participating device (e.g., 510a-510f) may also visit or migrate to other zones (e.g., geographic locations). Such zones other than the home zone may be referred to as a visitor zone. A visitor zone may be a zone in which the participating device has at least some shared attributes. However if a participating device (e.g., 510a-510f) develops more shared attributes with the participating devices of a visitor zone, the zone membership for the participating device may be updated such that visitor zone may be set as the home zone for such participating device.

In some aspects, a participating device (e.g., 510a-510f) may share its home zone information with the closest communicator node (e.g., 506, 508a, or 508b). For example, referring to FIG. 5, the participating device 510c may have a home zone of zone-2 504b. If the participating device 510c travels to zone-1 504a, the participating device 510c may transmit its home zone identification information (e.g., zone-2 610b) with the closest communicator node, such as the aggregator/communicator edge node 508a.

The zone configuration manager (e.g., 610b) may determine if the participating device is a member of the local zone (e.g., whether the current zone is the home zone for the participating device). If the participating device is a visitor, then the aggregator (e.g., 508b) of the home zone may be notified of the migration (e.g., visit to the visitor zone). As such, behavior patterns among migrating devices (e.g., 510a-510f) between zones may be determined from the home-visitor relationship. The zone configuration manager (e.g., 610b) for the home zone and the visitor zone may independently determine whether to include the participating device in zone aggregation (e.g., computing a federated average for the respective zone).

Figure 7A:
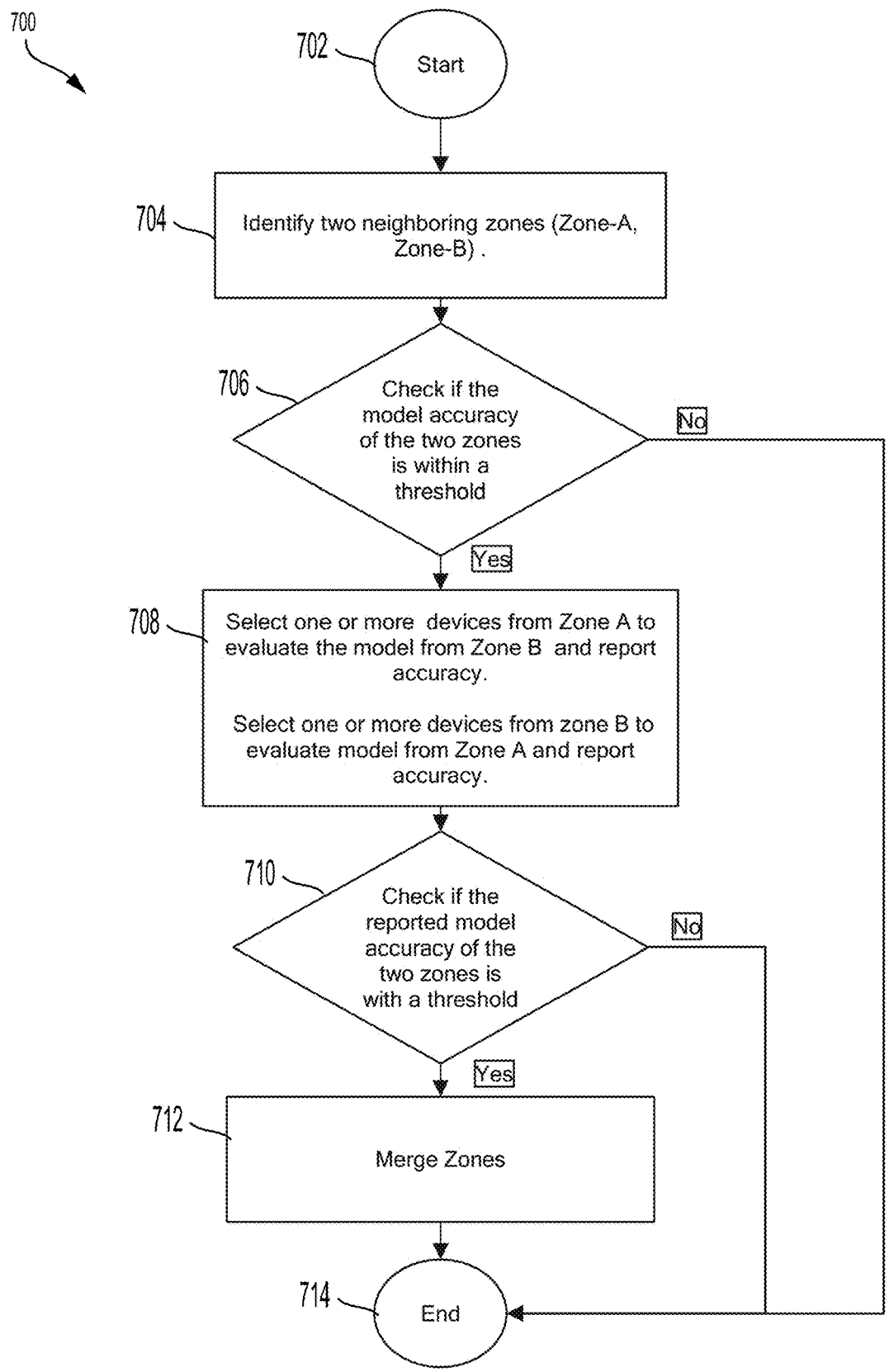
FIGS. 7A and 7B are flow diagrams illustrating example processes for merging zones or splitting a zone, in accordance with aspects of the present disclosure.
Figure 7B:
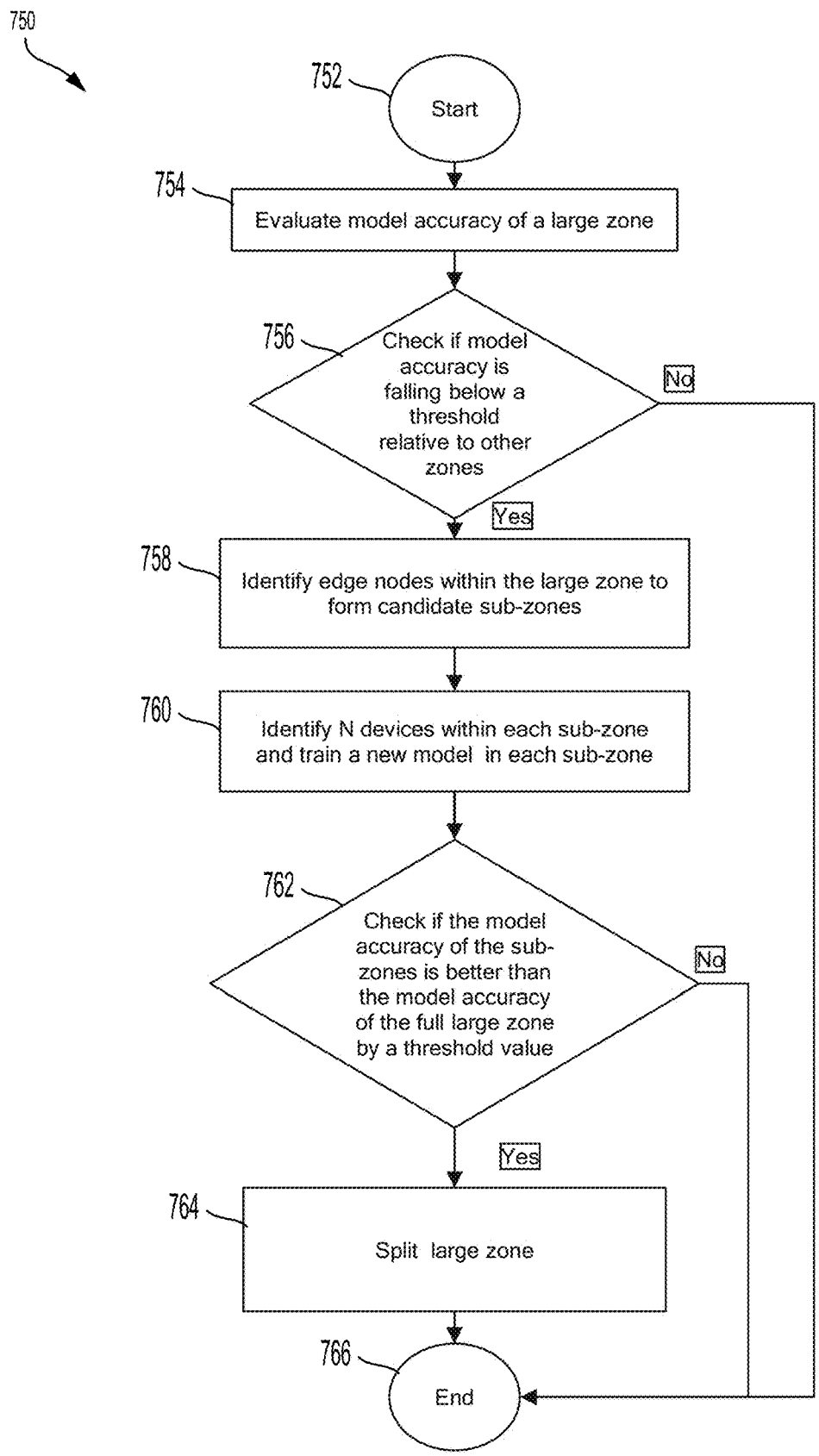

FIGS. 7A and 7B are flow diagrams illustrating example processes for merging neighbor zones 700 or splitting a zone 750, in accordance with aspects of the present disclosure.

Referring to FIG. 7A, the process 700 starts at block 702. The zone manager (e.g., 608) may initiate a zone configuration evaluation to check the zone configurations and manage the accuracy of the respective zone models and manage performance of the zone-based federated learning model. In the example of the FIG. 7A, the zone manager may determine whether two neighbor zones may be merged. At block 704, the zone manager may identify two zones as merge candidates (e.g., zone-1 504a and zone-2 504b). At block 706, the zone manager may determine (e.g., periodically) whether the zone model accuracy for the candidate zones are within a threshold. For example, the zone manager may instruct one or both of the aggregators for the candidate zones to determine whether the difference in accuracy for the zone models is within a threshold (e.g., <than 5%). If the difference in accuracy for the zone-models of the candidate zones is greater than the threshold, then the candidate zones may not be merged and the process ends at block 714. On the other hand, if the difference in accuracy for the candidate zones is less than the threshold, then the process may continue at block 708. In some aspects, the candidate zones may be merged.

At block 708, the zone manager may select one or more participating devices from each zone to evaluate the zone model of the other candidate zone. For instance, referring to FIG. 5, the zone manager of cloud device 502 may instruct participating device 510a of zone-1 504a to evaluate the accuracy of the zone model for zone-2 504b. The zone manager of cloud device 502 may also instruct participating device 510c and 510f to evaluate the accuracy of the zone model for zone-1 504a.

At block 710, the zone manager may determine if the model accuracy for the candidate zones are within a threshold. For instance, if the model accuracy for zone-2 as evaluated via participating device 510 is within a threshold value of the model accuracy for zone-1, as evaluated via participating devices 510c and 510f, then the zone manager may merge the candidate zones (e.g., zone-1 and zone-2). Conversely, if the model accuracy for zone-2 as evaluated via participating device 510 is not within a threshold value of the model accuracy for zone-1, as evaluated via participating devices 510c and 510f, then the zone manager may determine that the candidate zones may not be merged.

In some aspects, the zone manager may further generate and provide a zone configuration update to the configuration manager (610b). The zone configuration update may reassign one of the aggregators to be a communicator node, for instance. The configuration manager (e.g., 610b) may instruct the participating devices in each of the candidate zones to set their home zone to the merged zone.

Thereafter, at block 714, the process 700 may end.

It should be noted that while FIG. 7A provides an example process for merging zones, other processes for merging zones may be employed. For instance, in some aspects, zones may be combined based on a frequency of migration or number of devices (e.g., 510a-510f) migrating between zones. For example, if the frequency of migration or the number of participating devices exceeds a threshold value, then the zones may be merged.

FIG. 7B is a flow diagram illustrating an example process 750 for splitting a zone. Splitting a zone may be beneficial if the model accuracy in a particular zone begins to decrease relative to other zones. At block 752, the process may start. For example, the zone manager may monitor the zone configurations (e.g., number of participating devices) and performance of each zone model in the zone-based federated learning model. At block 754, the zone manager may determine whether the model accuracy for a zone is below a threshold. In some aspects, the model accuracy may be evaluated relative to one or more other zones. If the model accuracy is above the threshold, then the zone configuration may be maintained (e.g., the zone may not be split). If, on the other hand, the model accuracy is below the threshold, at block 758, the zone manager may identify edge nodes with the zone to form candidate sub-zones. At block 760, the zone manager may identify one more edge devices in each sub-zone. Each of the identified edge devices in the sub-zones may train a new model for the respective sub-zone.

At block 762, the model accuracy of the sub-zone models may be evaluated. If the model accuracy of the sub-zone models is not better than (e.g., less than) the model accuracy for the larger zone, then the zone may not be split. However, if the model accuracy of the sub-zones are better than (e.g., higher) the model accuracy for the larger zone by a threshold value, then at block 764, the larger zone may be split into the identified sub-zones. The zone manager may generate a zone configuration update indicating the splitting of a larger zone into sub-zones. The zone configuration update may be transmitted to the aggregators for the sub-zones. Each of the aggregators may instruct the edge devices in the subzones to update the home zone to the respective sub-zone.

Thereafter, at block 766, the process 750 may end.

Although FIG. 7B provides an example process for splitting or dividing a zone, other processes may be employed. For example, in some aspects, the configuration manager (e.g., 610b) for the zone may monitor the device mobility within the zone to determine if a split may improve the accuracy. For instance, if there is very little device mobility between two sub-regions of a large zone, then the zone manager may split the large zone into sub-zones if the split improves the overall accuracy.

Figure 8:
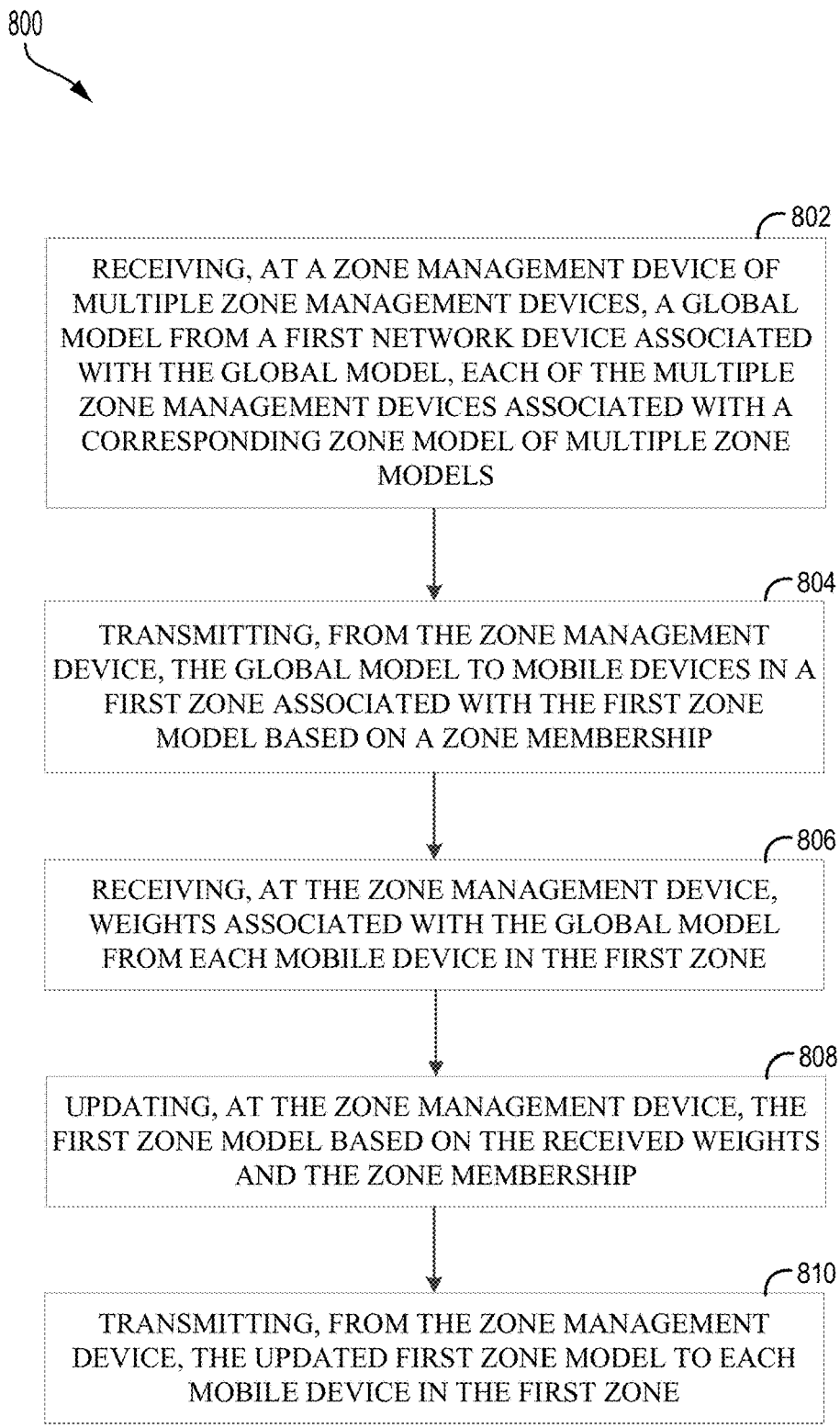
FIG. 8 is a flow diagram illustrating a method for mobility and zone management in zone-based federated learning, according to aspects of the present disclosure.

FIG. 8 is a flow diagram illustrating a method 800 zone management in zone based federated learning, according to aspects of the present disclosure. In block 802, the method 800 receives, at a zone management device of multiple zone management devices, a global model from a first network device associated with the global model. Each of the multiple zone management devices is associated with a corresponding zone model of multiple zone models. For instance, as shown in FIG. 5, each zone (e.g., 504a, 504b) may include an aggregator (e.g., 508a, 508b). The aggregator (e.g., 508a, 508b) may communicate with each of the participating devices in the zone. The aggregator may manage a zone model for a zone aggregating local updates from each of the participating devices in the zone. The aggregator may receive a global model from the cloud device 502. The aggregator may distribute the global model to each of participating devices in the zone. Each of the participating devices may be trained with global model to produce a local model.

At block 804, the method 800 transmits, from the zone management device, the global model to mobile devices in a first zone associated with the first zone model based on a zone membership. As described, the aggregator may distribute the global model to each of participating devices in the zone. In some aspects, the aggregators may limit the distribution to participating devices that identify the corresponding zone as the home zone.

At block 806, the method 800 receives, at the zone management device, weights associated with the global model from each mobile device in the first zone. As described with reference to FIG. 5, the aggregator may communicate with each of the participating devices within a zone. The aggregator may receive a local model update from each of participating devices in the zone.

At block 808, the method 800 updates, at the zone management device, the first zone model based on the received weights and the zone membership. The aggregator may receive a local update from each of the participating devices in the zone. The aggregator may aggregate the local model updates from the participating device that indicate that the zone is its home zone.

At block 810, the method 800 updates transmits, from the zone management device, the updated first zone model to each mobile device in the first zone. The aggregator may distribute the zone model update to each of the participating devices in the zone. In some aspects, the zone model update may be distributed to the devices that identify the zone as the home zone.

Implementation examples are provided in the following numbered clauses.
1. A method for managing model updates, comprising:
   receiving, at a zone management device of a plurality of zone management devices, a global model from a first network device associated with the global model, each of the plurality of zone management devices associated with a corresponding zone model of a plurality of zone models;
   transmitting, from the zone management device, the global model to mobile devices in a first zone associated with a first zone model based on a zone membership;
   receiving, at the zone management device, weights associated with the global model from each mobile device in the first zone;
   updating, at the zone management device, the first zone model based on the received weights and the zone membership; and
   transmitting, from the zone management device, the updated first zone model to each mobile device in the first zone.
2. The method of clause 1, in which the zone membership is determined based on at least one of a selection, a setting, or a preference indicated via each of the mobile devices.
3. The method of clause 1 or 2, in which the first zone is defined based on one or more first common characteristics for each of the mobile devices.
4. The method of any of clauses 1-3, in which at least one mobile device having a first zone membership for the first zone has a second zone membership for a second zone.
5. The method of any of clauses 1-4, further comprising determining a home zone for the at least one mobile device; and updating the first zone model based on the home zone determination.
6. The method of any of clauses 1-5, in which the first zone is merged with a second zone based on a difference in a first zone model accuracy for the first zone and a second zone model accuracy for the second zone.
7. The method of any of clauses 1-6, in which the first zone is split into multiple subzones based on a comparison of a first model accuracy for the first zone model and a second model accuracy for a subzone model.
8. An apparatus for managing model updates, comprising:
   a memory; and
   at least one processor coupled to the memory, the at least one processor being configured:
   to receive, at a zone management device of a plurality of zone management devices, a global model from a first network device associated with the global model, each of the plurality of zone management devices associated with a corresponding zone model of a plurality of zone models;
   to transmit, from the zone management device, the global model to mobile devices in a first zone associated with a first zone model based on a zone membership;
   to receive, at the zone management device, weights associated with the global model from each mobile device in the first zone;
   to update, at the zone management device, the first zone model based on the received weights and the zone membership; and
   to transmit, from the zone management device, the updated first zone model to each mobile device in the first zone.
9. The apparatus of clause 8, in which the at least one processor is further configured to determine the zone membership based on at least one of a selection, a setting, or a preference indicated via each of the mobile devices.
10. The apparatus of clause 8 or 9, in which the first zone is defined based on one or more first common characteristics for each of the mobile devices.
11. The apparatus of any of clauses 8-10, in which at least one mobile device having a first zone membership for the first zone has a second zone membership for a second zone.
12. The apparatus of any of clauses 8-11, in which the at least one processor is further configured:
   to determine a home zone for the at least one mobile device; and
   to update the first zone model based on the home zone determination.
13. The apparatus of any of clauses 8-12, in which the at least one processor is further configured to merge the first zone with a second zone based on a difference in a first zone model accuracy for the first zone and a second zone model accuracy for the second zone.
14. The apparatus of any of clauses 8-13, in which the at least one processor is further configured to divide the first zone into multiple subzones based on a comparison of a first model accuracy for the first zone model and a second model accuracy for a subzone model.
15. An apparatus for managing model updates, comprising:
   means for receiving, at a zone management device of a plurality of zone management devices, a global model from a first network device associated with the global model, each of the plurality of zone management devices associated with a corresponding zone model of a plurality of zone models;
   means for transmitting, from the zone management device, the global model to mobile devices in a first zone associated with a first zone model based on a zone membership;
   means for receiving, at the zone management device, weights associated with the global model from each mobile device in the first zone;
   means for updating, at the zone management device, the first zone model based on the received weights and the zone membership; and means for transmitting, from the zone management device, the updated first zone model to each mobile device in the first zone.

16. The apparatus of clause 15, further comprising means for determining the zone membership based on at least one of a selection, a setting, or a preference indicated via each of the mobile devices.

17. The apparatus of clause 15 or 16, in which the first zone is defined based on one or more first common characteristics for each of the mobile devices.

18. The apparatus of any of clauses 15-17, in which at least one mobile device having a first zone membership for the first zone has a second zone membership for a second zone.

19. The apparatus of any of clauses 15-18, further comprising means for determining a home zone for the at least one mobile device; and updating the first zone model based on the home zone determination.

20. The apparatus of any of clauses 15-19, further comprising means for merging the first zone with a second zone based on a difference in a first zone model accuracy for the first zone and a second zone model accuracy for the second zone.

21. The apparatus of any of clauses 15-20, further comprising means for dividing the first zone into multiple subzones based on a comparison of a first model accuracy for the first zone model and a second model accuracy for a subzone model.

22. An non-transitory computer readable medium having encoded thereon program code for managing model updates, the program code being executed by a processor and comprising:
program code to receive, at a zone management device of a plurality of zone management devices, a global model from a first network device associated with the global model, each of the plurality of zone management devices associated with a corresponding zone model of a plurality of zone models;
program code to transmit, from the zone management device, the global model to mobile devices in a first zone associated with a first zone model based on a zone membership;
program code to receive, at the zone management device, weights associated with the global model from each mobile device in the first zone;
program code to update, at the zone management device, the first zone model based on the received weights and the zone membership; and
program code to transmit, from the zone management device, the updated first zone model to each mobile device in the first zone.

23. The non-transitory computer readable medium of clause 22, further comprising program code to determine the zone membership based on at least one of a selection, a setting, or a preference indicated via each of the mobile devices.

24. The non-transitory computer readable medium of clause 21 or 22, in which the first zone is defined based on one or more first common characteristics for each of the mobile devices.

25. The non-transitory computer readable medium of any of clauses 22-24, in which at least one mobile device having a first zone membership for the first zone has a second zone membership for a second zone.

26. The non-transitory computer readable medium of any of clauses 22-25, further comprising:
program code to determine a home zone for the at least one mobile device; and
program code to update the first zone model based on the home zone determination.

27. The non-transitory computer readable medium of any of clauses 22-26, further comprising program code to merge the first zone with a second zone based on a difference in a first zone model accuracy for the first zone and a second zone model accuracy for the second zone.

28. The non-transitory computer readable medium of any of clauses 22-27, further comprising program code to divide the first zone into multiple subzones based on a comparison of a first model accuracy for the first zone model and a second model accuracy for a subzone model.

In one aspect, the receiving means, the transmitting means, the means for receiving weights, the updating means, and/or the means for transmitting the updated first zone may be the CPU 102, program memory associated with the CPU 102, the dedicated memory block 118, fully connected layers 362, and or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for managing model updates, comprising:
    receiving, at a zone management device of a plurality of zone management devices, a global model from a first network device associated with the global model, each of the plurality of zone management devices associated with one of a plurality of zones and a corresponding zone model of a plurality of zone models;
    transmitting, from the zone management device, the global model to mobile devices in a first zone of the plurality of zones, the first zone being associated with a first zone model;
    receiving, at the zone management device, weights associated with the global model from each mobile device in the first zone;
    updating, at the zone management device, the first zone model based on the received weights and a zone membership of each of the mobile devices, the zone membership of each mobile device being determined based at least in part on a zone mobility of each of the mobile devices, respectively, between the first zone and other zones of the plurality of zones; and
    transmitting, from the zone management device, the updated first zone model to each mobile device in the first zone.

2. The method of claim 1, in which the zone membership is determined based on at least one of a selection, a setting, or a preference indicated via each of the mobile devices.

3. The method of claim 1, in which the first zone is defined based on one or more first common characteristics for each of the mobile devices.

4. The method of claim 3, in which at least one mobile device having a first zone membership for the first zone has a second zone membership for a second zone.

5. The method of claim 4, further comprising determining a home zone for the at least one mobile device; and updating the first zone model based on the home zone determination.

6. The method of claim 1, in which the first zone of the plurality of zones is merged with a second zone of the plurality of zones based on a comparison of a difference in a first zone model accuracy for the first zone and a second zone model accuracy for the second zone with a predefined threshold.

7. The method of claim 1, in which the first zone of the plurality of zones is split into multiple subzones based on a comparison of a first model accuracy for the first zone model and a second model accuracy for a subzone model corresponding to one of the multiple subzones.

8. An apparatus for managing model updates, comprising:
    a memory; and
    at least one processor coupled to the memory, the at least one processor being configured:
    to receive, at a zone management device of a plurality of zone management devices, a global model from a first network device associated with the global model, each of the plurality of zone management devices associated with one of a plurality of zones and a corresponding zone model of a plurality of zone models;
    to transmit, from the zone management device, the global model to mobile devices in a first zone of the plurality of zones, the first zone being associated with a first zone model;
    to receive, at the zone management device, weights associated with the global model from each mobile device in the first zone;
    to update, at the zone management device, the first zone model based on the received weights and a zone membership of each of the mobile devices, the zone membership of each mobile device being determined based at least in part on a zone mobility of each of the mobile devices, respectively, between the first zone and other zones of the plurality of zones; and
    to transmit, from the zone management device, the updated first zone model to each mobile device in the first zone.

9. The apparatus of claim 8, in which the at least one processor is further configured to determine the zone membership based on at least one of a selection, a setting, or a preference indicated via each of the mobile devices.

10. The apparatus of claim 8, in which the first zone is defined based on one or more first common characteristics for each of the mobile devices.

11. The apparatus of claim 10, in which at least one mobile device having a first zone membership for the first zone has a second zone membership for a second zone.

12. The apparatus of claim 11, in which the at least one processor is further configured:
to determine a home zone for the at least one mobile device; and
to update the first zone model based on the home zone determination.

13. The apparatus of claim 8, in which the at least one processor is further configured to merge the first zone of the plurality of zones with a second zone of the plurality of zones based on a comparison of a difference in a first zone model accuracy for the first zone and a second zone model accuracy for the second zone with a predefined threshold.

14. The apparatus of claim 8, in which the at least one processor is further configured to divide the first zone of the plurality of zones into multiple subzones based on a comparison of a first model accuracy for the first zone model and a second model accuracy for a subzone model corresponding to one of the multiple subzones.

15. An apparatus for managing model updates, comprising:
means for receiving, at a zone management device of a plurality of zone management devices, a global model from a first network device associated with the global model, each of the plurality of zone management devices associated with one of a plurality of zones and a corresponding zone model of a plurality of zone models;
means for transmitting, from the zone management device, the global model to mobile devices in a first zone of the plurality of zones, the first zone being associated with a first zone model;
means for receiving, at the zone management device, weights associated with the global model from each mobile device in the first zone;
means for updating, at the zone management device, the first zone model based on the received weights and a zone membership of each of the mobile devices, the zone membership of each mobile device being determined based at least in part on a zone mobility of each of the mobile devices, respectively, between the first zone and other zones of the plurality of zones; and
means for transmitting, from the zone management device, the updated first zone model to each mobile device in the first zone.

16. The apparatus of claim 15, further comprising means for determining the zone membership based on at least one of a selection, a setting, or a preference indicated via each of the mobile devices.

17. The apparatus of claim 15, in which the first zone is defined based on one or more first common characteristics for each of the mobile devices.

18. The apparatus of claim 17, in which at least one mobile device having a first zone membership for the first zone has a second zone membership for a second zone.

19. The apparatus of claim 18, further comprising means for determining a home zone for the at least one mobile device; and updating the first zone model based on the home zone determination.

20. The apparatus of claim 15, further comprising means for merging the first zone of the plurality of zones with a second zone of the plurality of zones based on a comparison of a difference in a first zone model accuracy for the first zone and a second zone model accuracy for the second zone with a predefined threshold.

21. The apparatus of claim 15, further comprising means for dividing the first zone of the plurality of zones is split into multiple subzones based on a comparison of a first model accuracy for the first zone model and a second model accuracy for a subzone model corresponding to one of the multiple subzones.

22. A non-transitory computer readable medium having encoded thereon program code for managing model updates, the program code being executed by a processor and comprising:
program code to receive, at a zone management device of a plurality of zone management devices, a global model from a first network device associated with the global model, each of the plurality of zone management devices associated with one of a plurality of zones and a corresponding zone model of a plurality of zone models;
program code to transmit, from the zone management device, the global model to mobile devices in a first zone of the plurality of zones, the first zone being associated with a first zone model;
program code to receive, at the zone management device, weights associated with the global model from each mobile device in the first zone;
program code to update, at the zone management device, the first zone model based on the received weights and a zone membership of each of the mobile devices, the zone membership of each mobile device being determined based at least in part on a zone mobility of each of the mobile devices, respectively, between the first zone and other zones of the plurality of zones; and
program code to transmit, from the zone management device, the updated first zone model to each mobile device in the first zone.

23. The non-transitory computer readable medium of claim 22, further comprising program code to determine the zone membership based on at least one of a selection, a setting, or a preference indicated via each of the mobile devices.

24. The non-transitory computer readable medium of claim 22, in which the first zone is defined based on one or more first common characteristics for each of the mobile devices.

25. The non-transitory computer readable medium of claim 24, in which at least one mobile device having a first zone membership for the first zone has a second zone membership for a second zone.

26. The non-transitory computer readable medium of claim 25, further comprising:
program code to determine a home zone for the at least one mobile device; and
program code to update the first zone model based on the home zone determination.

27. The non-transitory computer readable medium of claim 22, further comprising program code to merge the first zone of the plurality of zones with a second zone of the plurality of zones based on a comparison of a difference in a first zone model accuracy for the first zone and a second zone model accuracy for the second zone with a predefined threshold.

28. The non-transitory computer readable medium of claim 22, further comprising program code to divide the first zone of the plurality of zones into multiple subzones based on a comparison of a first model accuracy for the first zone model and a second model accuracy for a subzone model corresponding to one of the multiple subzones.

* * * * *